Sept. 24, 1940.   H. MEYER-DELIUS ET AL   2,215,854
IGNITION OF DIRECT CURRENT HIGH VOLTAGE ELECTRIC ARCS
Filed Feb. 7, 1939
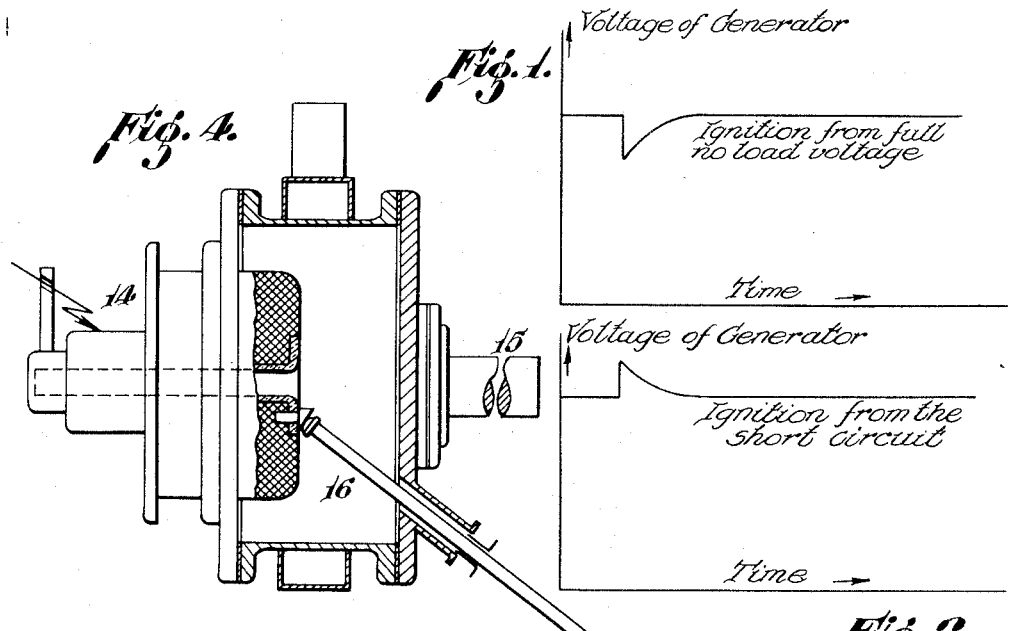
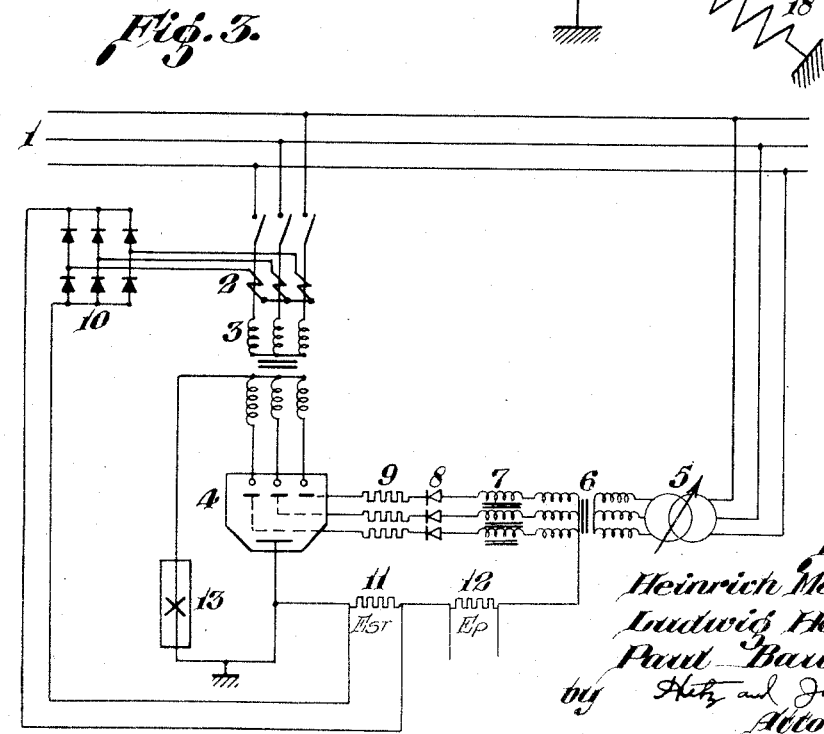
Inventors
Heinrich Meyer-Delius,
Ludwig Heer, and
Paul Baumann,
by Hilz and Joslin
Attorneys.

Patented Sept. 24, 1940

2,215,854

UNITED STATES PATENT OFFICE

2,215,854

IGNITION OF DIRECT CURRENT HIGH VOLTAGE ELECTRIC ARCS

Heinrich Meyer-Delius, Heidelberg, Ludwig Heer, Ludwigshafen-on-the-Rhine, and Paul Baumann, Leuna, Germany, assignors, by mesne assignments, to Jasco, Incorporated, a corporation of Louisiana Application February 7, 1939, Serial No. 255,026
In Germany February 8, 1938

6 Claims. (Cl. 175—354)

The present invention relates to improvements in igniting direct current high voltage electric arcs.

The various methods of igniting high voltage electric arcs, such as are used for the carrying out of chemical reactions, in particular for the production of unsaturated hydrocarbons, as for example acetylene, from hydrocarbons, have some faults which render it difficult, or even impossible, to put one or more electric arcs fed from a powerline into operation without fluctuations in voltage occurring in the entire line.

Such electric arcs have hitherto been ignited by applying to the electrodes of the reaction furnace the no-load voltage and initiating the arc by a short short-circuit. This kind of ignition has the drawback that a great current impulse occurs which causes a fall in voltage in the line so that in some cases electric arcs burning in parallel are extinguished. During the short time within which the whole process takes place, the rapid regulator of the feeding generator is unable to follow the fall in voltage and maintain the voltage in the line.

Up to now, when cutting in heavy loads, the equilibrium of which is generally not as labile as that of electric arcs, the procedure adopted was to increase the line voltage prior to cutting in said loads. This procedure is complicated and time consuming.

When making a direct connection of electric arcs of great power with a line which feeds several burning arcs arranged in parallel (as is for instance possible in the case of arcs of small power), such large voltage drops occur in the feeding line that the stability of the burning arcs arranged in parallel is endangered.

The present invention has for its object a process by which the said difficulties occurring during ignition are avoided.

According to this invention the electric arcs are fed from rectifiers with grid control or with internal igniters and the fall in voltage occurring during ignition is avoided by the use of regulating measures. By means of grid control of the rectifier or when using rectifiers with internal igniters, by control of the same the rectifier voltage is first regulated down to zero and then applied to the electric arc switch which is first short-circuited. By voltage regulation by means of the control of the rectifier, the short-circuit current is increased from a low value to a current sufficient for ignition at such a speed that the voltage regulator of the generator can keep the voltage practically constant. The regulator for the line voltage at the generator can thus follow the load so that the voltage is kept constant. Voltage shocks therefore do not occur. By opening the short-circuit the electric arc is then ignited without a current impulse occurring in the line and falls in voltage being caused by which parallel arcs are rendered unstable or the operation of other consumers is disturbed.

The short-circuit device, which is opened when the required current is reached, is preferably arranged within the electric arc furnace itself.

The opening and closing of the short-circuit may be effected automatically by a current relay, preferably in dependence on the electric arc current. The reduction of the rectifier voltage prior to the closing of the short-circuit may also be carried out automatically.

The invention is further illustrated by the accompanying drawing,

Figure 1 illustrating the course of the line voltage when ignition is effected by short circuiting from full no-load voltage;

Figure 2 illustrating the course of the line voltage when ignition is effected according to the present invention;

Figure 3 illustrating diagrammatically a system in accordance with the present invention, and Figure 4 illustrating an ignition device according to the present invention, the figure being an elevation partially in section.

On the drawing:

Referring to Figure 3, it will be seen that rectifier 4 is fed by line 1 through current transformer 2 and transformer 3. An alternating voltage, distorted by choke 7, is impressed on the grids of rectifier 4 through resistances 9 and valves 8 from a grid transformer 6 which is also connected to line 1. On this alternating grid voltage is imposed at resistance 7 a constant direct voltage $E_{st}$ which is taken from line 1 through current transformer 2 and rectifier 10. Moreover the alternating grid voltage is super-imposed by a constant positive direct voltage $E_p$ at resistance 12. Chokes 7 cut in to the grid supply always reduce the alternating grid voltage to the same extent, so that the displacement of the ignition impulse is dependent only on the difference between the voltages $E_p$ and $E_{st}$. The regulation of the short circuit current when arc 13 ignites is effected through revolving control 5 which changes the phase of the alternating grid voltage and thus the direct voltage.

In the ignition device shown in Figure 4 current is fed to electrode 14 which is insulated from the ground. The opposing electrode 15 is tube shaped and is grounded. The short circuit device 16 is permanently grounded. Figure 4 shows the conditions before ignition of the electric arc. The short circuiting pin 16 grounds the electrode 14 before the voltage is impressed. It is only then that connection is effected and by means of the rotating regulator 5 (Figure 3) the direct voltage is regulated till it is down to 0. The direct voltage is thereupon slowly increased in the short circuited state by means of said rotating regulator approximately until the normal current is reached. The speed regulator of the feeding generator can subsequently regulate the voltage with increasing load. The short circuiting pin 16 can be elevated by opening latch 17 and by spring 18. An electric arc results between electrode 14 and pin 16 which is then immediately blown into the tube shaped electrode 15 by corresponding gas streams. When the electric arc is ignited a sudden shift of the blank load to working load is effected and the voltage assumes the course indicated in Figure 2.

By the said manner of igniting the arc it is possible gradually to increase the loading current to full load strength so that strong strain on the rectifier by load shocks is avoided and the voltage regulation of the line follows with it at the same time so that fluctations of the voltage in the same are avoided. Electric arcs burning in parallel can therefore be continuously operated with the maximum possible power factor owing to the stability of the electric arc at constant voltage, without the setting in operation of further electric arcs influencing the operation of those already burning or without the influence of fluctuations in voltage having to be overcome by special means. By igniting electric arcs according to this invention, the ratio of the load is very rapidly displaced from blank load to working load so that on igniting indeed an increase in voltage even favorable for the operation occurs. The regulator of the generator now has the task of reducing the trivial voltage increase which occurs during the ignition of the electric arc to the regular voltage.

Moreover all overcurrent protective apparatus may be set only slightly higher than the normal current so that the plant is well protected against overcurrent.

What we claim is:

1. A method of igniting direct current high voltage electric arcs for carrying out chemical reactions while avoiding a fall in voltage from the power-line, the electric arcs being fed from controlled rectifiers, which comprises short-circuiting the electric arc to be ignited while free from voltage, switching in the short-circuited arc, controlling the rectifier to increase the short circuit current to a strength sufficient for ignition at such speed that the voltage regulator of the generator can keep the voltage practically constant and opening the short circuit to ignite the electric arc.

2. A method as claimed in claim 1, which consists in producing the short-circuit by means of a device arranged within the electric arc chamber itself, the opening of which initiates the electric arc.

3. A method as claimed in claim 1, which consists in carrying out the opening and closing of the short-circuit for the ignition of the electric arc automatically in dependence on the electric arc current.

4. A method as claimed in claim 1, which consists in carrying out the reduction in the rectifier voltage before automatically closing the short-circuit.

5. A method of igniting direct current high voltage electric arcs for carrying out chemical reactions while avoiding a fall in voltage from the power-line, the electric arcs being fed from rectifiers with grid control which comprises short-circuiting the electric arc to be ignited while free from voltage, switching in the short-circuited arc, controlling the rectifier to increase the short circuit current to a strength sufficient for ignition at such speed that the voltage regulator of the generator can keep the voltage practically constant and opening the short circuit to ignite the electric arc.

6. A method of igniting direct current high voltage electric arcs for carrying out chemical reactions while avoiding a fall in voltage from the power-line, the electric arcs being fed from rectifiers with internal ignition, which comprises short-circuiting the electric arc to be ignited while free from voltage, switching in the short-circuited arc, controlling the rectifier to increase the short circuit current to a strength sufficient for ignition at such speed that the voltage regulator of the generator can keep the voltage practically constant and opening the short circuit to ignite the electric arc.

HEINRICH MEYER-DELIUS.
LUDWIG HEER.
PAUL BAUMANN.